Nov. 22, 1955  E. R. FERRARI  2,724,294
SAW TOOTH SHAPER WITH ADJUSTABLY INTERCHANGEABLE DIE FACES
Filed Nov. 16, 1951  3 Sheets-Sheet 1
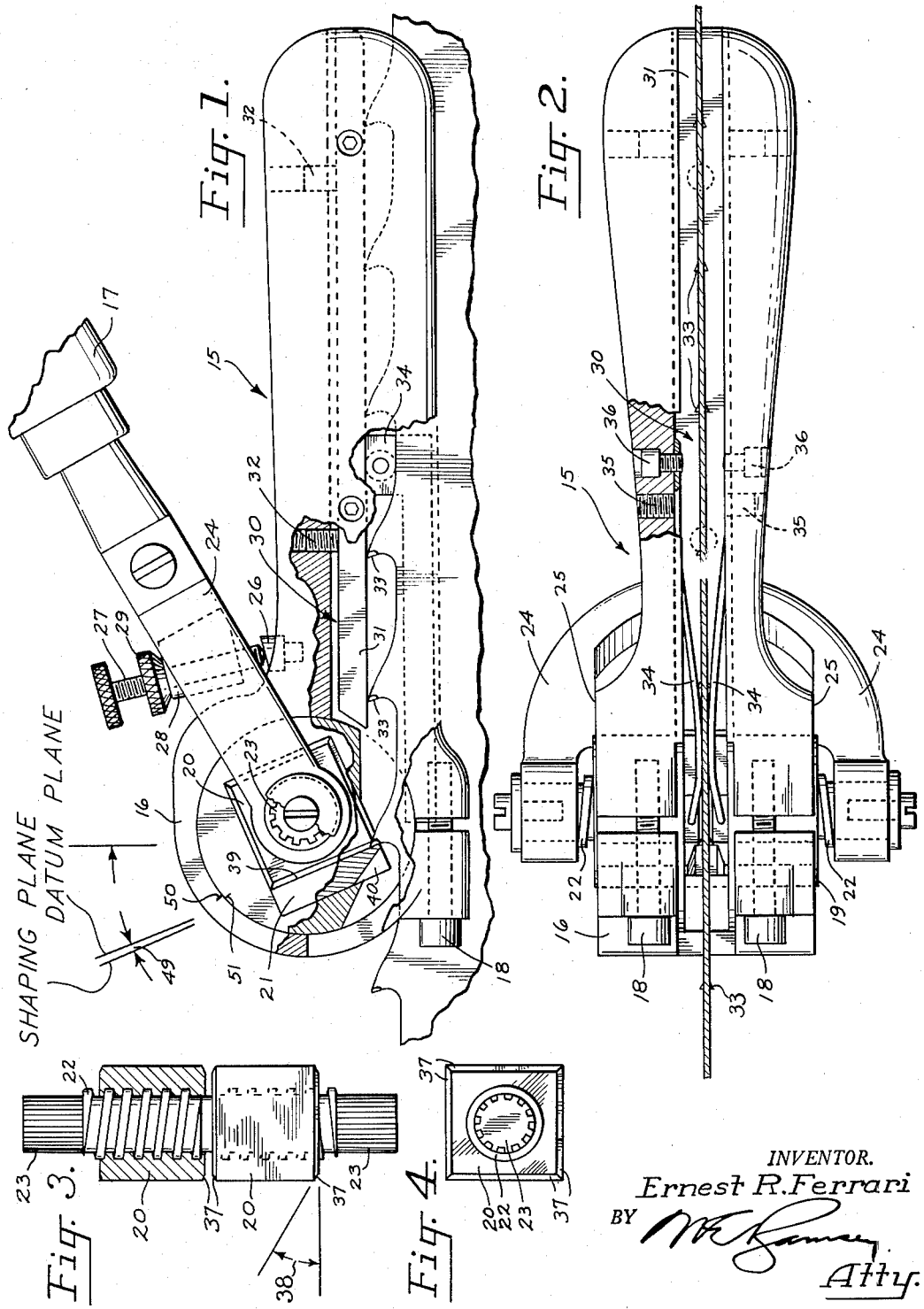
INVENTOR.
Ernest R. Ferrari
BY 
Atty.

Nov. 22, 1955 — E. R. FERRARI — 2,724,294
SAW TOOTH SHAPER WITH ADJUSTABLY INTERCHANGEABLE DIE FACES
Filed Nov. 16, 1951 — 3 Sheets-Sheet 2

INVENTOR.
Ernest R. Ferrari
BY
Atty.

Nov. 22, 1955  E. R. FERRARI  2,724,294
SAW TOOTH SHAPER WITH ADJUSTABLY INTERCHANGEABLE DIE FACES
Filed Nov. 16, 1951  3 Sheets-Sheet 3
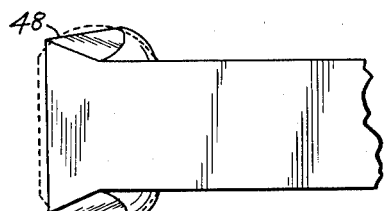
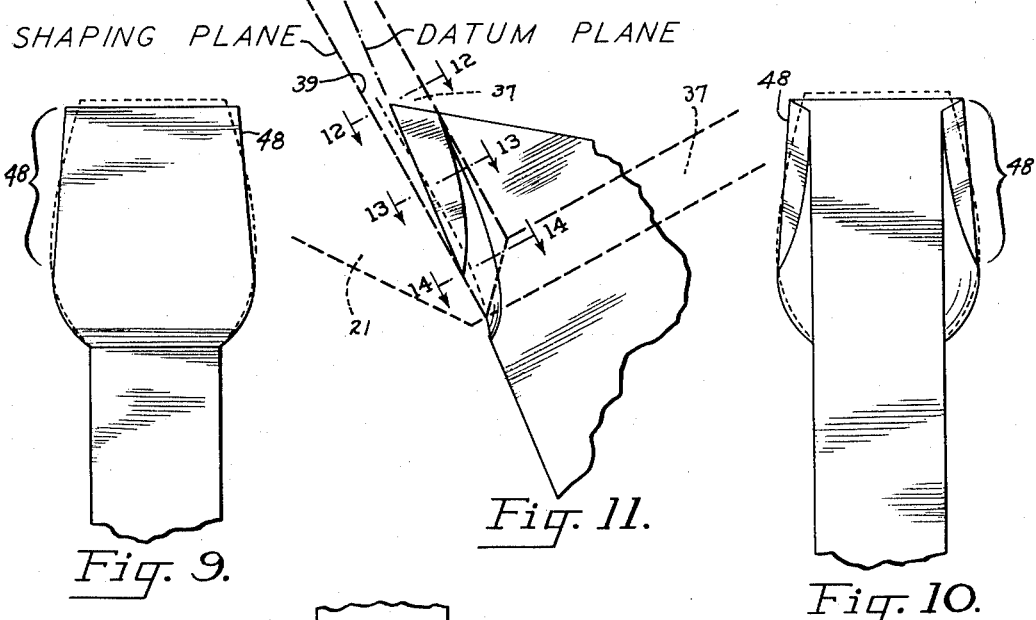
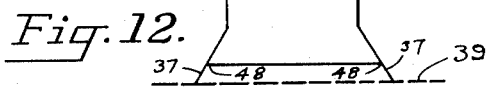
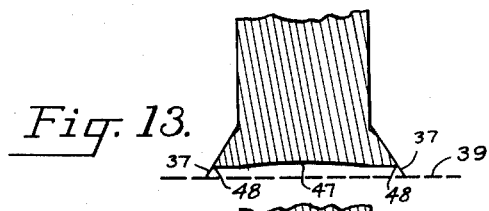
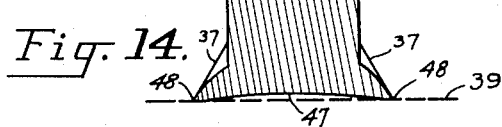
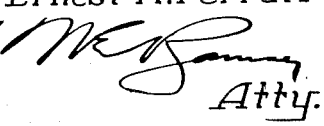
INVENTOR.
Ernest R. Ferrari
BY
Atty.

United States Patent Office 2,724,294
Patented Nov. 22, 1955

2,724,294

SAW TOOTH SHAPER WITH ADJUSTABLY INTERCHANGEABLE DIE FACES

Ernest R. Ferrari, Vancouver, Wash.

Application November 16, 1951, Serial No. 256,713

9 Claims. (Cl. 76—49)

This invention relates to a pair of compression dies for a saw tooth shaper and to a novel arrangement or angular disposition of the anvil tooth stop and the dies within a saw tooth shaper. More particularly, this invention is an improvement over the saw shaper disclosed in the United States patent to Ferrari, 2,201,766, and it is intended to shape teeth of the same type as therein discussed.

One object of this invention is to provide a pair of cube-like or rectangular parallelepiped dies for a saw tooth shaper, the marginal edges of the end faces of said dies being beveled at a uniform slope to define easily machined, interchangeable beveled die faces. Thus, not only are the dies useful over a longer period of time, but the work and the skill required in forming the die faces materially is reduced.

Die makers, saw filers, and others who work with saw shapers heretofore have thought that the pocket formed by the die faces and anvil tooth stop must be an exact intaglio of the saw tooth which is to be shaped. Thus, to shape a saw tooth to a particular outline or configuration heretofore has required that the reverse of the tooth be cut, machined or otherwise recessed in the surface of the die faces, with precision and nicety, so the metallic impression made therefrom will yield an image, in relief, of the shaped saw tooth. The skill and precision required in forming such intaglio die faces has promoted the die maker to a position of recognized skill and responsibility in the machine industry and the cost of procuring his labors has increased correspondingly. Accordingly, it is one prime object of this invention to reduce substantially the number of intricate grinding, cutting, scribing, and machining operations which need be performed to produce a die with which a saw tooth may be shaped. The prime advantage of such a labor reduction, of course, is the corresponding reduction in cost and in the amount of time consumed in the formation of a pair of die faces.

In particular, the saw tooth which is produced by the shaper of this invention and by the grinding processes associated therewith, is a tooth such as is disclosed in the United States patent to Ferrari and Hoffman, 2,071,618. This tooth is one known to the trade as a tooth for producing "smooth sawing" since it will produce a relatively smooth surfaced saw kerf which is substantially free from sawdust and splinters. To this end, the tooth has a substantially plane flat face which is bounded by rearwardly tapering flat sides and a substantially flat top. The face of the tooth, in outline, may be said to resemble a spade since the width of this face increases progressively and uniformly from the flat top thereof to a point adjacent the bottom or root of the tooth. This increasing width is evidenced by a slight divergence, at a uniform taper, along the marginal sides of the tooth face, the actual taper or increase in width being approximately .002 or .003 inch. However, it is the taper of this particular tooth which produces the desired "smooth saw" result. Accordingly, the shaper dies of the instant invention most particularly are designed and are used to shape a swedged tooth to a configuration which, eventually, will conform to that of the smooth saw tooth above described.

To this end, I provide a saw tooth shaper in which a pair of rectangular parallelepiped or similar non-circular shaper dies are mounted for movement toward and away from one another. Additionally, I provide an anvil having a plain face which abuts the dies and spans the distance therebetween to define a tooth stop. The cooperating inner or squeezing faces of the dies are beveled at a uniform slope to define the die faces. Thus, it immediately will be recognized that a die face which can be formed merely by beveling the edge of a rectangular solid is far less time consuming and costly to produce than one having intaglio die faces as heretofore required. However, it also will be recognized that a saw tooth which is shaped between uniformly beveled die faces while resting against a plane anvil tooth stop, will not, after shaping, define the divergent or flared tooth above described. Instead, the margins of the tooth face substantially will be parallel. This lack of divergence, however, is not fatal to the production of the desired tooth configuration for reasons now to be explained.

Conventionally, a saw tooth is shaped and sharpened, sequentially, as follows: (1) The tooth is swedged to upset the metal and form a cupped tooth face. (2) The tooth then may or may not be given an initial grinding or facing cut. In either event, it is shaped, in an intaglio die, to produce the desired configuration of a finished tooth. (3) Lastly, the face of the tooth is ground off or dressed slightly to sharpen the margins of the tooth face. With the shaper of the instant invention, the same sequence is followed, but, by varying certain of the steps, I am enabled to use the plane tapered or beveled die faces above described, yet eventually to produce a divergent rather than a parallel edged face. Thus, I first of all provide my shaper with means which position the working parts of the shaper at a fixed angle to the face of each saw tooth. That is to say, a datum plane is defined by the final grinding or dressing step or by the plane of the tooth which it is desired to produce. Having fixed the datum plane with respect to the shaper, the die faces are tilted or rotated with respect to this datum plane so that each saw tooth, as it is shaped, is provided with rearwardly tapering sides which slope at an oblique angle to the datum plane. Thereafter, the face of the tooth is ground down parallel to or in the datum plane rather than at the oblique angle of shaping. A grinding operation in this plane, it will be noticed, will cut across the face and sides of the tooth at an oblique angle to that angle which was defined by the shaping operation. For example, if the grinding operation removes more metal from that portion of the face which is adjacent the top of the tooth, the margins of the face will become divergent or tapered uniformly in accord with the configuration of the "smooth saw" tooth previously described. In summary, I have found that merely by tilting or rotating the die faces and the anvil tooth stop with respect to the preselected fixed datum plane, I am able to shape a tooth of the type desired. Furthermore, I am able to produce this tooth with die faces which are beveled at a uniform slope rather than being formed with an intaglio of the desired final tooth shape.

A further object and advantage of my invention is born from the provision of beveled or chamfered die faces on a rectangular die. Thus, given a cube or a rectangular parallelepiped die, individual identical die faces can be formed upon each of the square end faces of the die. In effect then, each die is provided with eight identical and interchangeable die faces. When one die face becomes pitted or otherwise unusable with wear, the rectangular die may be rotated 90° correctly to position a new die face adjacent the anvil tooth stop. After utilizing all four die faces on one end of the cube or rectangular parallelepiped, the entire die may be turned, end for end, and four new faces utilized. Effectively, I have found that this eight faced die will increase the life of the saw tooth shaper many times. This increased life is of particular importance to saw filers who must ply their trade in localities far removed from metropolitan areas since facilities for reworking a worn shaper die usually are available only in these latter areas.

Another object of my invention is to provide a shaper die face which is formed in a plane and as a bevel upon the end of a rectangular solid so that conventional metal working processes, such as grinding, may be utilized to form the die face and the die maker thereby will be enabled to utilize harder and tougher metal. That is to say, the intricate intaglio die faces heretofore employed have required the use of somewhat softer metals since the formation of an angular, curved, or otherwise intricate intaglio in very tough and hard metals is extremely difficult, time consuming, and costly. By simplifying the die face, I provide for better quality at a lower cost.

The above and other desirable objects and advantages inherent in my invention will become apparent from the ensuing description, taken in conjunction with the accompanying drawings, wherein:

Fig. 1 is an elevation of a saw tooth shaper embodying the principles of my invention, certain portions of this figure being broken away to disclose details of construction and the shaper being shown mounted on a section of a saw blade;

Fig. 2 is a bottom view of the shaper shown in Fig. 1, portions of this view also being broken away;

Fig. 3 is a detail view of the shaper dies, one die being shown in section and one die in plan;

Fig. 4 is an end view of one die, this figure better indicating the manner in which all four margins of the end face of the die may be beveled or chamfered uniformly to define four interchangeable die faces;

Figure 5:
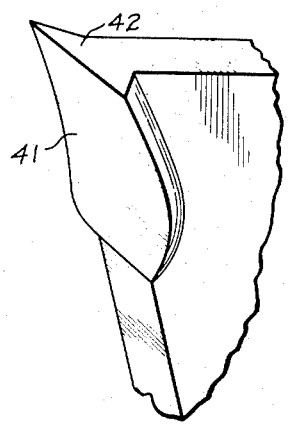
Figure 6:
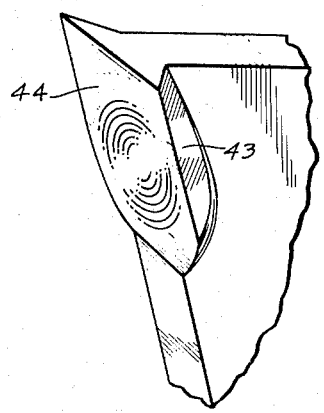
Figure 7:
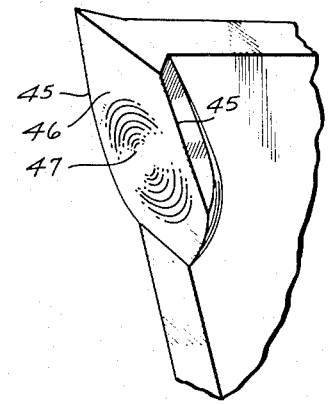
Figure 15:
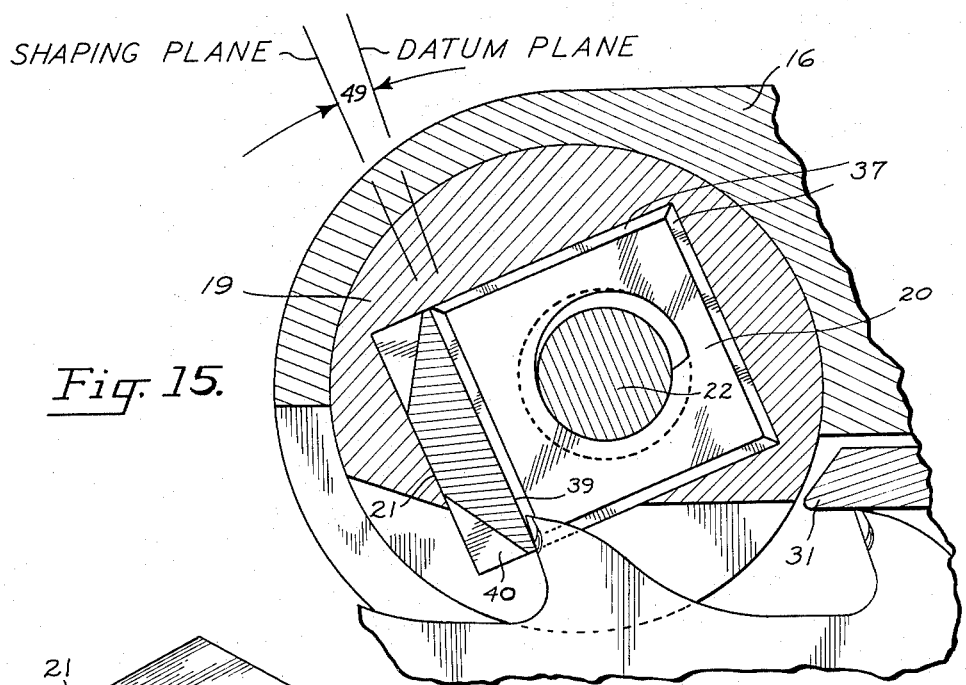
Figure 16:
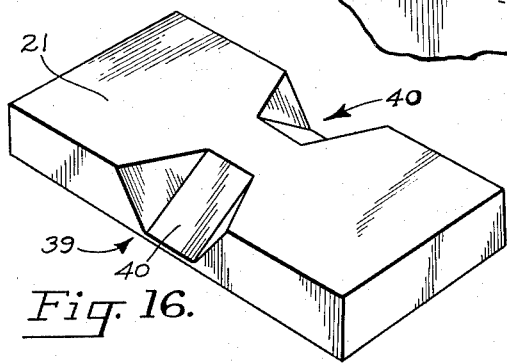

Figs. 5, 6, and 7 are related detail views showing a saw tooth after swedging, after shaping, and after grinding, sequentially and respectively;

Figs. 8, 9 and 10 are related top, front, and back views, respectively, of a finished saw tooth, the dashed outlines thereon indicating the shape of a swedged tooth prior to shaping;

Fig. 11 is a side view of a saw tooth, the full lines indicating a finished tooth and the dashed lines a swedged but unshaped tooth. In this figure, the plane of the anvil tooth stop (shaping plane) and the datum plane are indicated diagrammatically to illustrate the tilt or rotation of the shaper parts which is an important part of this invention;

Figs. 12, 13 and 14 are related full and sectional detail views taken on the lines 12—12, 13—13, and 14—14 of Fig. 11, respectively, to indicate that divergence of the tooth face edges which differentiates a "smooth saw" tooth from all others;

Fig. 15 is an enlarged detail view of the head of my shaper showing a tooth in place against the anvil tooth stop and between the die faces; and Fig. 16 is a perspective view of the anvil tooth stop, this figure better indicating the twin cutaway portions of the back thereof.

Referring to Figs. 1 and 2, the shaper embodying my invention includes a body portion 15 having a tubular head 16 at one end upon which a lever and handle portion 17 pivotally is mounted. The head of the shaper body is split laterally along the bottom and a pair of screws 18 cooperate therewith to define a clamp. This clamp encircles and carries a circular journaled barrel member 19 having a transverse bore, preferably of a rectangular cross section, formed therein. It is this bore which carries the two compression dies 20 and the anvil tooth stop 21. Thus, as best shown in Fig. 15, the anvil abuts the dies so that these three elements, together, fit complementarily within the bore of the barrel.

Returning to Figs. 1, 2, and 3, an elongated lead screw 22 is provided with two opposite hand threads which are complementary to threads tapped longitudinally through the centers of the respective dies 20. Accordingly, a rotation of the lead screw 22 will cause the dies 20 to move longitudinally toward and away from one another equal distances. Additionally, the end of the lead screws 22 are serrated, as at 23, for non-slip engagement with the bifurcated ends 24 of the operating lever upon which the aforementioned handle 17 is carried. This handle 17, when rotated counter-clockwise as viewed in Fig. 1, will move the dies 20 away from one another. A clockwise rotation will move the dies toward one another. Lateral displacement of the bifurcated ends 24 with respect to the tubular head 16 is prevented by the slidable engagements indicated at 25 in Fig. 2.

To preselect the end of the operating stroke of the lever and handle 17, a button 26 is set in the body of the shaper 15 and a set screw 27 threadably is carried by the projecting portion 28 of the operating lever. A lock nut 29 may be added if desired. In any event, the end of the set screw 27 abuts the button 26 to stop the closure of the dies at a distance slightly exceeding the gauge of the saw blade.

The body of the shaper 15 is slotted longitudinally throughout the length thereof as shown by the slot 30. Within this slot, a tooth rest bar 31 adjustably is mounted, as with recessed set screws 32. It is this tooth rest bar 31 upon which the teeth 33 of a saw blade rest immediately after these teeth are shaped successively and while the shaper is moved thereover. Additionally, a pair of flat, spring like longitudinal guides 34 are mounted in the slots 30, as by means of the screws 35 and the twin adjustment screws 36. These guides 34 preferably are formed of spring steel so as slidably to engage and frictionally to hold the sides of the saw body across the gauge thereof. In total, the tooth rest bar 31 and the guides 34 define a way for supporting the body member 15 in a fixed position upon the teeth of a bandsaw blade so the face of that tooth which is being shaped will define a fixed datum plane as hereinafter will be described.

Having set forth the general details of the shaper, the particular structure of the dies and the anvil tooth stop 21 now will be described. Thus, as indicated in Figs. 3 and 4, the dies 20 are cubes or rectangular parallelepiped bodies having four plane side faces and plane ends or inner and outer faces. It is the plane inner and outer faces which are chamfered or beveled, as indicated as 37, to define interchangeable plane tapered die faces. The angle of bevel or taper is preselected in accord with the desired rearward taper of a saw tooth and this angle is indicated diagrammatically at 38 in Fig. 3. The anvil, on the other hand, is a rectangular solid body (see Fig. 16) having a plane face 39 which defines a tooth stop. The rear face of the anvil carries twin cutaway portions 40 over which the tops of the saw teeth 33 ride and slide as the shaper is moved along the saw blade (see Fig. 1). Further, as shown in Figs. 1 and 15, the tooth stop 39 is in face-to-face abutment with the dies 20 so those die faces 37 which terminate at the tooth stop will define a pocket to receive the saw tooth during shaping. Thus, when a particular pair of the die faces 37 wears or becomes pitted, the dies 20 may be rotated 90° with respect to the anvil tooth stop 21 and a new pair of die faces will be presented for use. After four pair of the die faces have become worn, the twin dies 20 may be interchanged, end for end, and four new die faces will be presented for use. On the other hand, should the plane tooth stop 39 wear, it too may be turned end for end since the cutaway portions 40 are identical. In total, these provisions increase the life of the working parts of the shaper approximately eight times. The importance of this increased life can be illustrated with an example. Thus, the teeth of a band resaw blade are shaped once in every three or four sharpenings. Under normal conditions, the shaper of the previous Ferrari patent had an effective die face life span of five to six months. After five or six months, the dies were removed and a new set inserted in the shaper, the old set being returned to the die maker for re-working and re-forming. With the instant dies, removal and reworking will be required only once in about four or five years. Thus, replacement costs are cut and the saw filer need not stock as many sets of dies.

Turning now to a second important feature of my invention, Figs. 5, 6, and 7 are detail views of a saw tooth after swedging, after shaping, and after grinding, sequentially and respectively. In the first of these figures, the face 41 of the tooth is concave while the top 42 is wedge-shaped and terminates forwardly in relatively sharp points at each side of the face. This configuration has been formed by upsetting the material of the saw tooth with a swedge following a circular rotation such as is conventional.

In Fig. 6, the tooth has been shaped by the dies 20 and the anvil tooth stop 21. This shaping, of course, was effected by the squeeze of the die faces 37 against the sides of the saw tooth to provide the tapered sides 43 which conform, in intaglio, to the bevel 37 of the die faces. Additionally, the face 44 of the shaped tooth has been flattened somewhat by contact with the plane tooth stop 39. That is to say, this face 44 was forced against the tooth stop by the compressive action of the die faces. This particular tooth, it is to be noted, does not possess the divergent or spade-shaped margins of the face such as is desired in a "smooth saw" tooth. However, referring to Fig. 7, this latter tooth does possess the divergent margins 45 on the tooth face 46. Additionally, a small pocket 47 remains in the face of the finished saw tooth since the effect of the swedging will not disappear entirely until after two or three sharpenings.

In progressing from the tooth of Fig. 6 to that of Fig. 7, an important point is to be noted. Thus, the face of the tooth has been ground down or dressed by a grinding wheel or the like which moves in a fixed (datum) plane across the face. This grinding wheel, as hereinafter will be described, moves in a datum plane which is arranged so that slightly more metal is removed from the top of the tooth face than from the bottom thereof. In effect, this causes the grinding operation to proceed at an oblique angle to the plane defined by the face 44 of the tooth in Fig. 6.

In Figs. 8, 9, and 10, the full lines bound a finished saw tooth while the dashed outlines bound a saw tooth which has been swedged but not shaped. Accordingly, these figures may be used precisely to locate the divergent or tapered edges of the tooth face, as shown at 48. In Fig. 11, on the other hand, the anvil 21, the plane tooth stop 39, and the die faces 37 all are indicated in dashed outline with respect to a finished tooth which is shown in full outline and a swedged but unshaped tooth which is shown in dashed outline. Further, as shown in this figure, the plane of the finished tooth face (which is the same plane in which the final grinding or dressing operation is performed) defines a datum plane indicated by the words "datum plane." As indicated by the words "shaping plane," the plane tooth stop 39 is arranged at an inclined or oblique angle to the datum plane. These two planes are tilted or rotated with respect to one another through an angle which is shown diagrammatically at 49. This angle 49, in turn, is calculated exactly to define the divergence 48 which is required in the finished tooth. For example, 3 or 4 degrees of rotation may be sufficient, with a particular tooth and shaper, to provide the .002 or .003 inch divergence needed in a smooth saw tooth. Further, to aid the shaper operator or saw filer in establishing this angle initially, two marks 50 and 51 may be formed on the body of the shaper 16 and the barrel 19. Initially, the anvil tooth stop and dies will be set at the same angle as the finished tooth face and the two marks 50 and 51 will coincide. Thereafter, the screws 18 will be backed off and the entire barrel member 19 will be rotated a preselected and a calculated amount within the tubular head 16 to tilt the dies and anvil tooth stop through the angle 49. The screws 18 then are retightened, the adjustment set screw 27 is set to position, and the shaper is ready for use.

In use, a saw blade, such as that which carries the saw teeth 33 in Fig. 1, is positioned on a work table or bench and is clamped in place for shaping. Thereafter, the shaper is placed over the saw blade so the teeth 33 rest upon the tooth rest bar 31 and the spring guides 34 slidably clamp and guide the gauge of the saw blade. These latter elements serve to position the working parts of the shaper at a preselected fixed datum plane relative to the face of the smooth saw tooth which it is desired to produce. Previously, of course, the plane of the tooth stop 39, shown as a "shaping plane" in Figs. 1, 11, and 15, has been tilted or rotated through the angle 49 with respect to the datum plane. Accordingly, as the lever and handle 17 are rotated clockwise, the dies 20 are moved toward one another to compress and shape the saw tooth. This shaping operation causes the die faces 37 to produce the tooth of Fig. 6 wherein the sides 43 are tapered rearwardly at the angle of taper of the die faces but the margins of the tooth face 44 are parallel.

After shaping one tooth, the shaper is moved along the saw blade and the next succeeding tooth rides over the cutaway portion 40 of the anvil tooth stop and is positioned between the die faces. After all the teeth are shaped, the final dressing, grinding, or sharpening operation is performed in the datum plane shown in Figs. 1, 11, and 15. This operation produces the divergent edges 48 of the tooth face since it cuts across the beveled sides at the oblique angle 49 and in the datum plane. Thus, the finished smooth saw tooth of Figs. 7 to 14 is produced with the divergent edges illustrated by the sectional views of Figs. 12 to 14, inclusive. It will be noted, however, that this divergent tooth has been produced with die faces 37 which easily are machined since they are formed at a uniform plane bevel on cube-like or rectangular parallelepiped die faces.

In summary, I have provided a shaper which is both less expensive to fabricate and less expensive to use since the die faces easily are machined and the die faces are interchangeable. Such a shaper is effective to produce the desired tooth configuration because the anvil tooth stop and dies are tilted or rotated from a datum plane to a shaping plane and the mechanism which supports the shaper upon the teeth does so at a precise and exact angle, each and every time.

I claim:

1. In a saw tooth shaper, a pair of elongated compression dies detachably mounted for movement between an open and a compression position, each die having an inner square face and four side faces defining a parallelepiped body, at least two of the marginal edges of each square inner face being beveled to define interchangeable die faces, and an anvil having a plane face abutting said dies and spanning the distance therebetween to define a tooth stop, the plane face of said anvil lying at an oblique angle to that fixed datum plane which is defined by the plane face of a saw tooth in position to be shaped.

2. In a saw tooth shaper, two parallelepiped bodies defining complementary, spaced compression dies carrying plane square end faces, the four marginal edges of said square end faces being chamfered along identical slopes to define interchangeable die faces, and an anvil having a plane face abutting said dies to define a tooth stop, each cooperating pair of die faces, when mounted to terminate in abutment with said tooth stop, defining an identical tooth shaping pocket.

3. A saw tooth shaper, comprising a pair of elongated shaper dies detachably mounted for movement endwise toward and away from one another, each die having an inner and an outer plane square face and four plane side faces defining a rectangular parallelepiped body, at least two of the marginal edges of each square inner and outer face being beveled at a uniform slope to define interchangeable tapered die faces, and an anvil having a plane face abutting said dies and spanning the distance therebetween to define a tooth stop, each cooperating pair of die faces, when mounted to terminate in abutment with said tooth stop, defining an identical wedge-like tooth shaping pocket with the die faces forming the sloping sides of the wedge and the tooth stop forming the wide base thereof, the plane face of said anvil being disposed at a fixed angle to that fixed datum plane in which the plane face of a saw tooth lies while positioned for shaping between the die faces.

4. In a saw tooth shaper having means for positioning the working parts of the shaper in a fixed datum plane relative to the face of a tooth, a pair of non-circular compression dies having a majority of the marginal edges of the end faces thereof tapered to define a plurality of interchangeable die faces, and a plane faced anvil spanning the distance between a companion pair of said die faces, said anvil lying at an oblique angle to said datum plane and forming with said companion pair of die faces an unyielding, continuous, three sided confining wall for limiting and defining the profile of a saw tooth shape therebetween.

5. In a saw tooth shaper having means for mounting the working parts of the shaper in a preselected datum plane which is fixed relative to the face of a tooth, a pair of rectangular parallelepiped shaper dies having the marginal edges of the end faces thereof tapered uniformly to define a plurality of interchangeable die faces, and an anvil having a plane face abutting said dies and spanning the distance between said die faces and abutting the margins thereof, said anvil face and said dies all being mounted at an oblique angle to said datum plane.

6. A saw tooth shaper, comprising a body member carrying means for positioning said body member at a fixed angular disposition upon the teeth of a bandsaw blade so the face of that tooth which is in position to be shaped will define a preselected and a fixed datum plane, a barrel member pierced by a transverse bore, means mounting said barrel member for rotational adjustment within said body member, a pair of elongated shaper dies and an abutting, plane faced anvil together being slidably but non-rotatably mounted within the bore of said barrel, said barrel member and the dies and anvil carried thereby being adjusted rotatably, with respect to said body member and datum plane, so the plane face of the anvil lies at an oblique angle to said datum plane.

7. A saw tooth shaper, comprising a body member carrying means for supporting the body member in a fixed position upon the teeth of a bandsaw blade so the face of that tooth which is in position to be shaped will define a fixed datum plane, a circular barrel member pierced by a transverse bore of rectangular crosssection, means mounting said barrel member for rotational adjustment within said body member, a pair of rectangular parallelepiped bodies defining elongated sharper dies with four plane side faces and complementary plane square inner faces, the marginal edges of the inner faces being beveled at a uniform slope to define tapered die faces, and an anvil having a plane face abutting the margin of one die face on each body and spanning the distance therebetween to define a tooth stop, said anvil and pair of bodies together being carried non-rotatably within the bore of the barrel, said barrel member and the dies and anvil carried thereby being rotated with respect to said body member and datum plane so the plane face of the anvil and the datum plane define an acute angle and the datum plane intersects said die faces at an oblique angle.

8. A saw tooth shaper, comprising a body member carrying means for supporting the body member in a fixed position upon the teeth of a bandsaw blade, a barrel member pierced by a transverse bore, means mounting said barrel member for rotational adjustment within said body member, a pair of rectangular parallelepiped bodies defining elongated shaper dies with four plane side faces and complementary plane square inner faces, the marginal edges of the inner faces being beveled at a uniform slope to define tapered die faces, and an anvil having a plane face abutting the margin of one die face on each body and spanning the distance therebetween to define a tooth stop, said anvil and pair of bodies together being carried non-rotatably within the bore of the barrel.

9. In a saw tooth shaper, adjustable means for positioning the working parts of the shaper at a preselected datum plane relative to the face of a tooth which is to be shaped, said means and working parts comprising; a pair of parallelepiped bodies defining shaper dies having complementary plane square inner faces, the marginal edges of said inner faces being beveled at a uniform slope to define interchangeable die faces, and an anvil having a plane face abutting the margin of one die face on each body to define a tooth stop, said anvil and dies being mounted with the plane face of the anvil arranged at an acute angle to said datum plane.

References Cited in the file of this patent

UNITED STATES PATENTS

| | | |
|---|---|---|
| Re. 16,072 | Pribnow et al. | May 19, 1925 |
| 447,111 | Hanson | Feb. 24, 1891 |
| 690,075 | Pribnow | Dec. 31, 1901 |
| 884,061 | Armstrong | Apr. 7, 1908 |
| 987,935 | Wilms | Mar. 28, 1911 |
| 1,078,377 | Pribnow | Nov. 11, 1913 |
| 1,153,444 | Ricker | Sept. 14, 1915 |
| 1,179,556 | Pribnow | Apr. 18, 1916 |
| 1,799,623 | Gommel | Apr. 7, 1931 |
| 2,201,766 | Ferrari | May 21, 1940 |